SABATHE & JOURDAN.
Preserving Wood.
No. 58,036.  Patented Sept. 11, 1866.
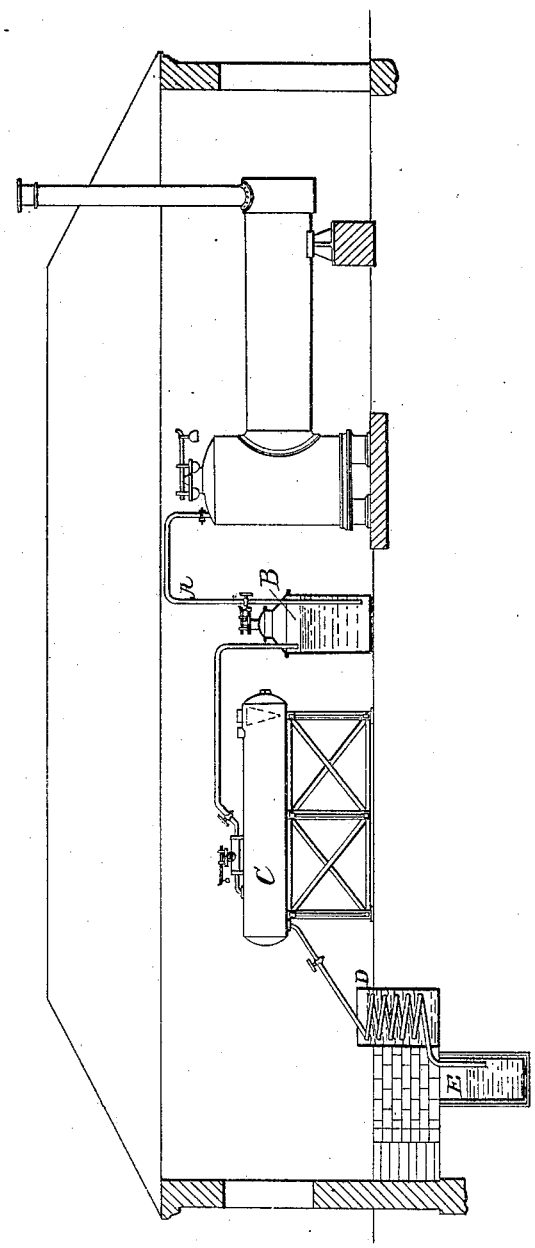

UNITED STATES PATENT OFFIC[E]

EMILE SABATHÉ AND LOUIS JOURDAN, OF PARIS, FRANC[E]

IMPROVEMENT IN IMPREGNATING SUBSTANCES WITH PRESERVATIVE MATERIAL.

Specification forming part of Letters Patent No. 58,036, dated September 11, 1866.

*To all whom it may concern:*

Be it known that we, EMILE SABATHÉ, engineer, and LOUIS JOURDAN, chemist, both of Paris, France, have invented a new process of preserving in the air, in fresh or salt waters, any vegetable or animal substances, in the raw or in the manufactured state, such as flax, hemp, cotton, ropes, nets, cloth, sails, papers, skins, leather, and the like; and we do hereby declare that the following is a full, clear, and exact description of the same, reference being had to the annexed sheet of drawing, making a part of the same, and which represents an elevation of the apparatus, partly in section, which we have successfully used in carrying out our invention.

Our invention consists in a new process for preserving any vegetable or animal substances from decaying when exposed to the air or in fresh and salt waters, whether said substances are in the raw or manufactured state.

We will arrange and describe our improvements under three principal heads—first, the nature of our preserving matters; secondly, the mode of application of said preserving matters to the substances which are to be preserved; thirdly, the apparatus used for the application of said substances.

I. As preserving substance we make use of a metallic soap insoluble in water—a metallic soap, for instance, with base of zinc, lead, copper, alumen, iron, manganese, and the like, or two or more of said soaps mixed together. We also make use of any sort of fatty materials, resins, or bitumina chemically combined, or merely mixed in various proportions with oxides or metallic salts; but among such mixtures or combinations we only admit those that are soluble in a volatile substance or made fusible through the medium of heat.

We are guided in the choice of these fatty resinous bituminous matters, oxides, or metallic salts by the saving to be realized, the great flexibility to be insured to the materials in preservation, the use they are intended for, and the importance which they derive in certain cases from their primitive color being unaltered.

As regards the salts or metallic oxides to be used, we prefer those with base of zinc, copper, or lead.

We are perfectly aware that the substances we have mentioned, or the mixtures or c[om]binations of oxides or metallic salts with fa[tty] or resinous bodies, have already been [em]ployed for preserving certain vegetable [or] animal matters from the action of water [and] air. We do not claim, therefore, the said m[ix]tures or combinations, but only the means [by] which application thereof is made to the s[ub]stances to be preserved, which means or p[ro]cesses we are about to describe.

II. We apply the said mixtures or com[bi]nations, according to the nature of the m[ate]rial to be preserved, through either one of [the] three following processes, which constitu[te] chiefly, our invention: First, in dissolvi[ng] the said mixtures or combinations by mea[ns] of a volatile liquid, such as turpentine, benzine, petroleum, or schist, sulphuret [of] carbon, &c., not omitting to mention that [we] have obtained the best results with benz[ine] from gas-tar or from petroleum, and with t[he] sulphuret of carbon; secondly, in mainta[in]ing the said mixtures or combinations to t[he] state of fusion through heat, in which state [we] dip the matter to be preserved; thirdly, [in] mixing the preserving matters with the s[ub]stances to be preserved—for instance, t[he] paper-pulp.

In case we make use of a volatile solve[nt] it is proper to avoid the loss of the same [in] preparing of matters to be preserved. We the[re]fore effect the impregnation in a closed ves[sel] arranged much like a distilling apparatus, a[nd] communicating with a worm, wherein the v[a]pors come in to be condensed. Thus, when t[he] substances are sufficiently saturated with t[he] solutions, we draw out or decant the latter, a[nd] heat the boiler, either by a direct current [of] steam or otherwise, to a sufficient temperatu[re] so as to effect the distillation of the volati[le] solvent still retained by the substance to [be] preserved, which, after the vaporization of t[he] solvent, remains perfectly penetrated wi[th] a comparative quantity of the preserving m[a]terial with regard to the solution which w[as] used.

The comparative proportions of the preser[v]ing matters and of the solvents are to va[ry] according to their nature and the quality a[nd] price of the products to be preserved.

We would state that by using as solven[t] certain bodies—as benzine or sulphuret of ca[rbon]

, for instance—the material to be preserved ery quickly and completely penetrated by preserving-liquid, and when the proporis of the solvent and of the preserving tter are properly calculated we obtain this y notable result—that the fibers are as dily separated from one another as if they l undergone no previous operation, and the tile material may be spun and worked as dily as before the said preparation.

he second mode of treatment, already aled to, consists in passing the materials to preserved into the preserving substances )t through heat in a state of fusion. This cess is chiefly employed by us for cloth l cordages manufactured, whether the fibers l been or not already treated in the distilling paratus. For ropes and cordages, we squeeze m, on their coming out from the melted npound, by some suitable mechanical pros, so as to have only a thin layer of the comnd left. For sails and cloth, we press them tween two cylinders on their being taken t of the melted compound, which they are de to pass through, care being taken to ve them properly maintained in their width. The proportions of the mixtures or combitions, as alluded to at the beginning of this ecification, may admit of many variations. e will, however, propose one which was productive of excellent results, both for the good eservation of the products and the saving procures in the preparation.

To dilute four thousand pounds of chalk (or equivalent amount of finely-pulverized lime) to about eleven hundred gallons of water; mix into it sixteen thousand pounds of vegable tar, two thousand pounds of pine-rosin, d heat the whole: The mass will swell. We itate until not any more froth is produced the surface thereof; then we add from seven ousand to eight thousand pounds of crystaled sulphate of zinc, (or an equivalent in chlode of zinc;) to leave on the fire and agitate e mass until it becomes homogeneous, and ld thereto from two thousand to four thound pounds of coal-tar. When this preparaon is over, we dissolve it cold into sulphuret carbon, in the proportion of about twenty arts of the said preparation for one hundred arts of sulphuret, and have it filtered preious to making use of it. This filtration ay take place in the very distilling appaatus by means of a filter placed beneath the outh through which the liquid is introduced.

In order to obtain a non-colored compound, stead of tar, as above, we substitute rosin, to hich we add about fifteen per cent. of tallow r oleic acid, or any other fatty fluid or uncuous matter to be had at a cheap price; but hen we add the fatty matters only, after the omplete baking with the salt of zinc, merely o avoid the decomposition thereof.

III. The form and dimensions of the distilling apparatus are to vary according to the ature and amount of the products to be preerved, and therefore we do not confine ourselves to any particular form, arrangement, and size of the same. We will, however, indicate the following arrangements, which procured us a satisfactory result, reference being had to the drawing annexed to the present specification, and wherein—

A is a water-steam boiler or generator, either stationary or not, and of any system; B, pressure-gage. This is a boiler filled with water up to two-thirds. In this water a pipe leading from the generator and dipping down toward the bottom of boiler B raises the steam to a more or less pressure, but, in general, from three to six atmospheres. To this pipe, and near to the boiler B, are fitted two stop-cocks, between which is a safetyvalve for regulating the steam-pressure within the boiler B, from whence the steam escapes through another pipe communicating with the upper part of the immerging and distilling boiler C. At the lower part of said boiler or vessel is fitted a pipe, which is in direct communication with the worm through a stop-cock. The vapors, after being condensed on their way from the worm D, are collected into a recipient, E.

At one end of C is formed an opening, which is closed at will, and serves to admit the matters to be impregnated. These are placed on hurdles or open baskets in order to facilitate the passage of the steam. Rails, upon which said baskets run, render more commodious the working thereof.

Other rails placed on C serve to convey there the reservoirs containing the preservingsolution, introduced therein through any suitable opening, beneath which is placed a cloth bag-like filter for retaining the non-dissolved substance. In this manner the residues are, after the distilling process, perfectly clear of the volatile solvent, the loss of which is thereby avoided.

An interval of about four inches separates the matters to be prepared from the bottom of boiler C. We have found it indispensable to place on the wire-work or hurdle bottom of the apparatus a layer of filtering material, such as sawdust, sand, pumice, &c., which precaution has for effect to prevent the pasting which might be produced in the lower layers of the matters to be preserved on the drawing out of the preserving-liquid.

The working of these apparatus will be sufficiently understood from what has been said, reference being had to the annexed drawing, without it being necessary to give further explanation.

We must observe, however, that for the purpose of obtaining a uniform impregnation and tint, we fit an axis, one end of which is pivoting on the stationary bottom of the cylinder C, while the other end leans upon a bearing near to the inside vertical plan of the locking of said cylinder. This locking or closing is formed with a hole in its center, through which projects the end of the metallic axis, that may be set in motion either by means of a hand-crank or any other suitable motor. On this axis are fitted prickles or rods, set in regular line, and between which we place the textile materials or the skins and leather.

When woven or manufactured substances are to be operated upon, instead of the longitudinal prickle apparatus, we make use of hook-rods fitted perpendicular to their supporting-axis. This is loaded with the woven material, which is hooked up as close as possible to the said axis, and moved successively from hooks to hooks, so as to form a regular spiral round the said axis, which is afterward set in motion during the distilling process at a moderate speed.

Having thus fully described our process, and the manner of carrying it out in practice, what we claim therein as new, and desire to secure by Letters Patent, is—

Preserving vegetable or animal substances, whether in a raw or manufactured state, by means of a soap, as herein described, having a metallic base insoluble in water, but soluble in volatile liquids or by heat or distillation, and applied in such soluble condition to the article or thing to be preserved by it, substantially as herein set forth and explained.

EM. SABATHÉ.
LOUIS JOURDAN.

Witnesses:
EDWARD TURK,
F. F. RANDOLPH.